United States Patent [19]
Rose et al.

[11] Patent Number: 5,938,255
[45] Date of Patent: Aug. 17, 1999

[54] INSTALLATION TOOL FOR HANGING SIGNS

[76] Inventors: Sidney Rose, 2 Front St., Marblehead; Alan L. Stenfors, 28 Cedarwood Rd., Scituate; Michael S. Hoffman, 3 Cutter Ct., Marblehead, all of Mass. 01945

[21] Appl. No.: 08/876,641

[22] Filed: Jun. 16, 1997

[51] Int. Cl.⁶ ................ A47F 13/06; B25J 1/00
[52] U.S. Cl. ............ 294/19.1; 248/340; 248/544
[58] Field of Search .............. 294/19.1, 22–24, 294/85; 29/225; 40/601, 617, 666; 81/53.11, 53.12, 487; 248/317, 339, 340, 343, 544

[56] References Cited

U.S. PATENT DOCUMENTS

| | | | |
|---|---|---|---|
| 545,606 | 9/1895 | Nelson | 294/19.1 |
| 817,741 | 4/1906 | Armstrong | 294/19.1 |
| 828,012 | 8/1906 | Armstrong | 294/24 |
| 2,385,820 | 10/1945 | Leibow | 294/19.1 X |
| 3,893,005 | 7/1975 | Corbin | 294/19.1 X |
| 4,163,576 | 8/1979 | Hoop | 294/19.1 |
| 4,249,763 | 2/1981 | Provencher et al. | 294/19.1 |
| 5,052,733 | 10/1991 | Cheung et al. | 294/19.1 |
| 5,188,332 | 2/1993 | Callas . | |
| 5,247,725 | 9/1993 | Vaughn | 294/19.1 X |
| 5,267,764 | 12/1993 | Hoffman et al. | 294/19.1 |
| 5,480,116 | 1/1996 | Callas . | |

*Primary Examiner*—Johnny D. Cherry
*Attorney, Agent, or Firm*—Don Halgren

[57] ABSTRACT

The present invention discloses a tool to permit the support and lifting of a planar sign member to a ceiling so as to attach that sign to a ceiling support rail. The tool comprises an elongated pole having a first or lower end and a second or upper end and a frame assembly attached to the upper end of the pole. A pair of spaced apart yokes are mounted on the top side of the frame assembly. Each yoke is arranged to directionally align and hold a ceiling anchor thereon, from which anchor, sign support hooks hang, to permit a sign to be hung from the anchor upon the anchors being secured to a ceiling rail by the tool extending thereagainst.

7 Claims, 3 Drawing Sheets

INSTALLATION TOOL FOR HANGING SIGNS

BACKGROUND OF THE INVENTION

1. Field of the Invention

This invention relates to tools for suspending sheet material from an overhead support structure for display.

2. Prior Art

Hanging signs in retail stores and shops, is often very difficult, and may require several people to do that job. Often stepladders or ladders have to be used while one person holds the sign and the other person attaches wires or hangers to an overhead support.

Some advances in the art have taken place. One such is a tool, shown in U.S. Pat. No. 5,188,332, to Callas. This tool however uses a complicated wire release mechanism which permits the lifting of an elongated magnetic hanger to a ceiling support frame. One of the problems associated here is that the sign must be parallel to the ceiling support frame. Typically the magnet would not hold if the support assembly were attached at an angle with respect to several support frames.

It is an object of the present invention, to provide an installation tool for attaching a large sheet of materials such as a display sign from at least one or more ceiling suspension members.

It is yet a further object of the present invention, to provide a ceiling sign installation tool, which may be readily handled by only one individual.

It is yet a still further object of the present invention, to provide a sign installation tool which permits a large sign to be disposed at an angle with respect to one or more ceiling support members.

It is yet still a further object of the present invention, to provide an installation tool for attaching different types of connecting components to ceiling support suspension members, and not just one type of connector.

BRIEF SUMMARY OF THE INVENTION

The present invention comprises a multi-head sign hanging installation tool. This tool is utilized to hang and support a large planar object from ceiling support bars. Such installation process is intended to be done only by one individual. The installation tool comprises a holdable, elongated telescopable pole having an upper end and a lower end. A frame assembly is attached to the upper end of the support pole. The frame assembly comprises a pair of elongated half-frame sections which clamp about the upper end of the pole in a cylindrically shaped hollow space provided between them. Each half-frame section is generally of elongated rectangular configuration. Each half-frame section has as its midpoint a channel extending transversely across, so as to comprise the cylindrically shaped opening for receipt of the upper end of the pole. Each half-frame section has a pair of spaced-apart channels parallel with respect to the middle channel; each of the spaced-apart channels is arranged to engage and hold rigidly, a ceiling anchor installation yoke, which yoke is shown in U.S. Pat. No. 5,267,764 which is incorporated herein by reference. Each yoke is of generally "Y" configuration, having a pair of spaced-apart uppermost arms. The distal or upper ends of the arms engage an attachable head which is utilized to secure a ceiling anchor to a ceiling rail or structure supporting the ceiling.

Each half-frame section is about 6 inches long, about ¾ inch thick and about 2 inches high. A bore extends transversely through the thickness of each half-frame section, at each respective channel.

Each yoke has a hub which extends in its respective channels defined by the assembled half-frame sections. Each hub has a pair of bores extending transversely therethrough, so as to permit the yokes to be oriented parallel or transverse to the longitudinal axis of the assembly head. It is contemplated that the plane of the yokes could also be aligned at an obtuse angle with respect to the plane or longitudinal axis of the assembly head. The distal end portions comprising the uppermost bifurcated ends of each yoke are arranged to carry an installment head thereon. Each installment head is adapted to carry a particular type of ceiling anchor, as may be seen in the aforementioned U.S. Patent. Each ceiling anchor is adapted to clip onto the side edges of a ceiling rail by a twisting motion thereagainst. Ceiling rails may be of different types in supporting any particular ceiling. Therefore, the yokes may be required to attach different types of anchors. Some rails may have different cross-section, some may be plastic or metal. Therefore, those anchors may be different size clips, magnets or adhesively attachable, depending upon the ceiling support rail configuration.

In operation of the ceiling anchor installation tool of the present invention, a particular ceiling anchor is arranged upon each installment head on the distal end of each of the bifurcated yokes. A short hook member is inserted into each anchor and disposed downwardly between the bifurcated arms of each yoke.

An elongated rigid hook is secured to each side of a channel mounted onto and holding the upper edge of a sign to be supported from the ceiling. The loose distal upper end of each elongated rigid hook is secured to the lower end of each short hook member already extending downwardly from each anchor. The lower end of the telescopable pole is held at a slight angle from the vertical, tilting slightly to one side to allow a first anchor thereon, the anchor to be installed onto a ceiling rail by twisting the anchor mechanism thereagainst. A twisting action secures the first anchor to the ceiling rail, and the tilted support pole is next lifted to another location to permit the second anchor to be pressed against and locked into engagement on a further portion of the same or another ceiling rail so as to permit the sign to be hung with spaced-apart ceiling anchors disposed on a rail at a location further apart than the yokes are on the installation tool. The anchors may be nudged one way or another longitudinally with respect to the axis of their respective ceiling rails, so as to permit the sign to be hung in a stable and level manner.

The invention thus comprises a tool to permit the support and lifting of a planar sign member to a ceiling so as to attach that sign to a ceiling support rail, the tool including an elongated pole having a first or lower end and a second or higher end; a frame assembly attached to the first end of the pole; and a pair of spaced apart yokes mounted on the frame assembly, each yoke arranged to directionally align and hold a ceiling anchor thereon, from which anchor, sign support hooks hang, to permit a sign to be hung from the anchor upon the anchors being secured to a ceiling rail by the tool extending thereagainst. The frame assembly comprises a pair of generally rectangularly shaped half-frame members, each of the half-frame members having a first channel disposed across one side thereof, to define a cylindrically shaped opening for receipt of the upper end of the elongated pole.

The half-frame members each also have a pair of further channels arranged on the side common to the first channel, each spaced so as to provide a cylindrically shaped opening for receipt of the yoke therein. At least one of the yokes defines a plane and the axis of the channel and longitudinal axis of the frame member may be identified to define a vertical plane, the planes may be parallel or angled with respect to one another. At least one of the yokes may define a plane which is perpendicular to the plane defined by the longitudinal axis and the channel of the frame-half. The channel has a bore extending transversely therethrough so as to receive a bolt for securing the frame-halves together. The anchors may have corner channels thereon, which engage side edges of a ceiling rail so as to secure an anchor in parallel alignment thereon.

The invention includes a method of attaching a sign to a ceiling support rail in a ceiling, comprising the steps of: attaching a pair of yokes to a frame assembly, which yokes each directionally align and carry an anchor for attachment to a ceiling support rail; attaching the frame assembly to an elongated pole to permit the yokes and anchors to be lifted upwardly towards a ceiling; attaching a hook arrangement to the anchors and to a sign to be lifted towards a ceiling; lifting the pole in a tilted manner with the anchors towards a ceiling rail; arranging a first anchor in parallel alignment with and attaching the first anchor to a ceiling rail; moving the frame assembly to a further ceiling rail location; lifting the pole again in a tilted manner so as to bring only the yoke with the anchor still remaining thereon adjacent the further ceiling rail location, and arranging a second anchor in parallel alignment with and attaching the second anchor to the further ceiling rail location and hence attaching a sign to a ceiling rail assembly in a ceiling. The method includes the step of nudging at least one of the anchors attached to a rail, in a direction parallel to the rail, to permit moving and placement adjustment of the anchors and hence leveling and horizontal adjustment of a sign suspended thereby. The method includes the step of placing an anchor in one of the yokes which is different in style and construction from the anchor in the other of the yokes to permit anchors to secure to different ceiling rails.

BRIEF DESCRIPTION OF THE DRAWINGS

The objects and advantages of the present invention will become more apparent when viewed in conjunction with the following drawings, in which.

DESCRIPTION OF THE PREFERRED EMBODIMENTS

Figure 1:
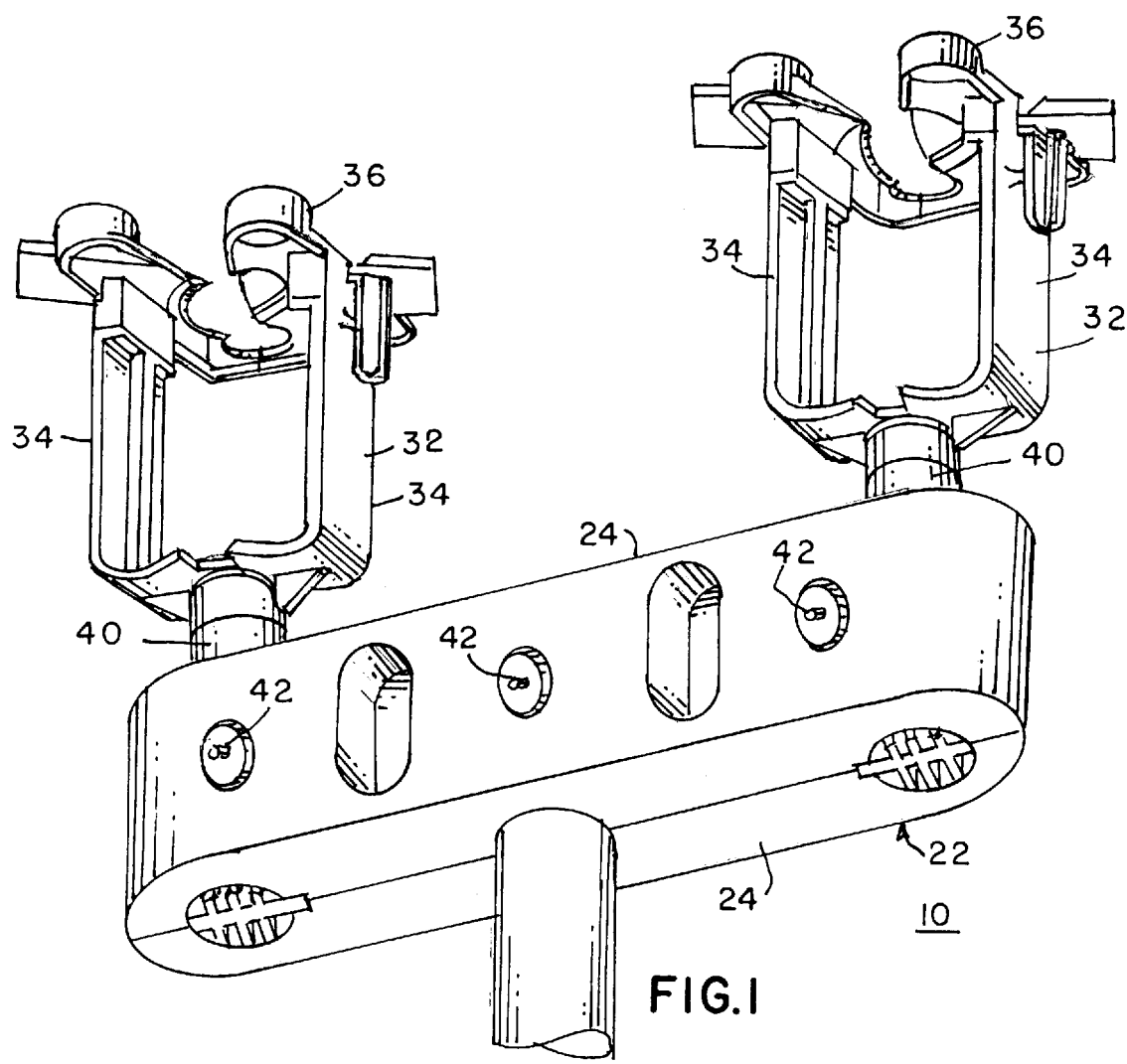
FIG. 1 is a view, in perspective, of an installation tool having a pair of yokes thereon, without any anchors disposed therewith.
Figure 5:
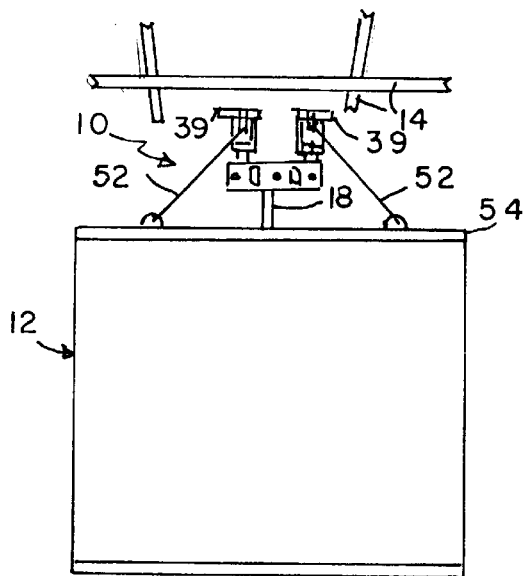
FIG. 5 is a side elevational view showing an installation tool raising a sign against a ceiling rail.

Referring to the drawings in detail, and particularly to FIG. 1, there is shown the present invention which comprises a multi-head sign hanging installation tool 10. This sign installation tool 10 is utilized to hang and support a large planar object 12 from one or more ceiling support bars 14, as shown in FIG. 5. Such installation process is intended to be done only by one individual. The sign installation tool 10 comprises a holdable, elongated telescopable pole 16 having an upper end 18 and a lower end 20. and a frame assembly 22.

Figure 2:
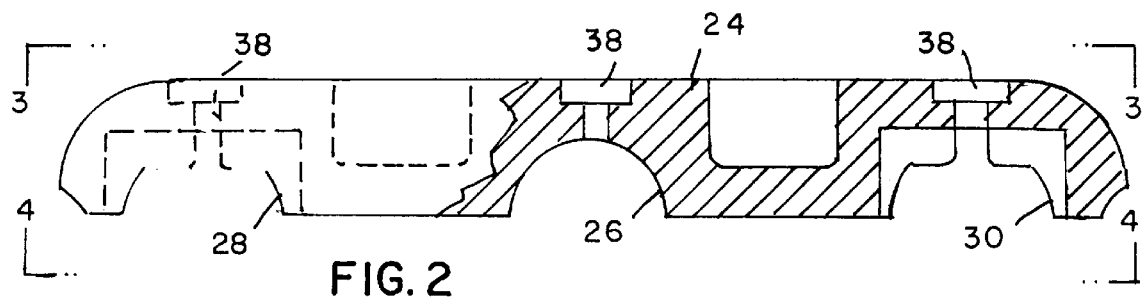
FIG. 2 is a side elevational view of an assembly halve showing the securement bores therethrough.
Figure 3:
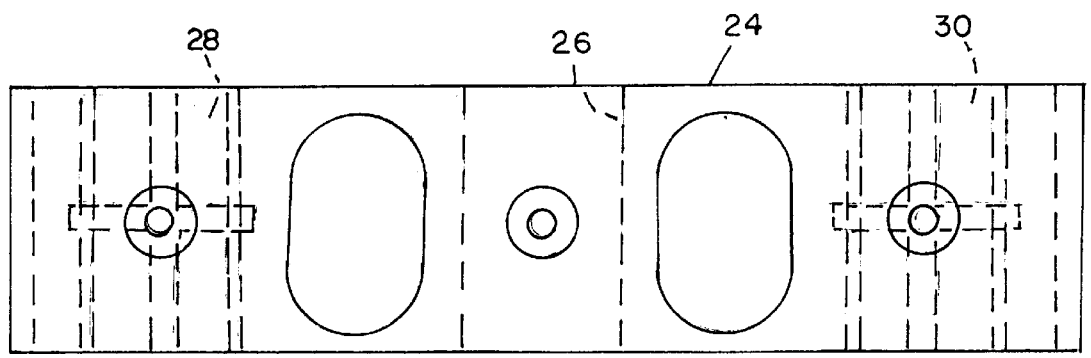
FIG. 3 is a view taken along the lines 3—3 of FIG. 2.
Figure 4:
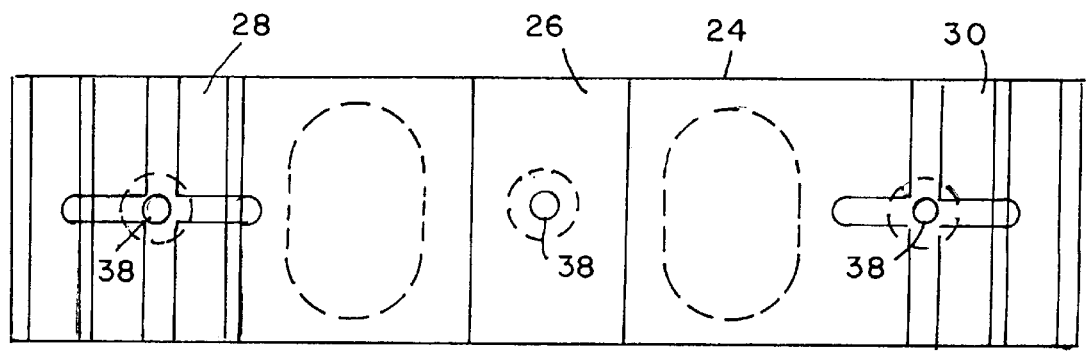
FIG. 4 is a view taken along the lines 4—4 of FIG. 2.

The frame assembly 22 is attached to the upper end 18 of the support pole 16. The frame assembly 22 comprises a pair of elongated half-frame sections 24 which clamp about the upper end 18 of the pole 16, in a cylindrically shaped hollow space provided between them. Each half-frame section 24 is generally of elongated rectangular configuration, as shown in FIGS. 2, 3 and 4. Each half-frame section 24 has as its midpoint, a channel 26 extending transversely thereacross, so as to comprise the cylindrically shaped opening for receipt of the upper end 18 of the pole 16. Each half-frame section 24 has a pair of spaced-apart channels 28 and 30 parallel with respect to the middle channel 26, each of the spaced-apart channels 28 and 30 being arranged to engage and hold rigidly, a ceiling anchor installation yoke 32, which yoke 32 is shown in U.S. Pat. No. 5,267,764 which is incorporated herein by reference. Each yoke 32 is of generally "Y" configuration, having a pair of spaced-apart uppermost arms 34. The distal or upper ends of the arms 34 engage an attachable head 36 which is utilized to secure a ceiling anchor 39 to the ceiling rail 14 or structure supporting the ceiling.

Each half-frame section 24 is about 6 inches long, about ¾ inch thick and about 2 inches high. A bore 38 extends transversely through the thickness of each half-frame section 24, at each respective channel 26, 28 and 30.

Figure 7:
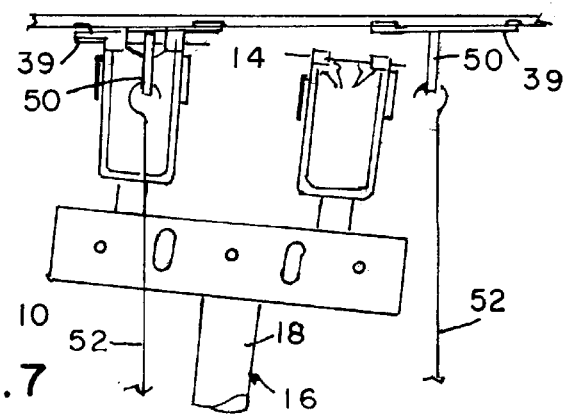
FIG. 7 is a side elevational representation of a second anchor being installed onto a ceiling rail.

Each yoke 32 has a lower hub 40 which extends in its respective channels 28 and 30 defined by the assembled half-frame sections 24. Each hub 40 has a pair of bores, not shown, extending transversely therethrough, so as to permit a bolt 42 to extend through, and lock the yokes 32 to the frame-sections 24, so as to be oriented parallel or transverse to the longitudinal axis of the assembly head 22, or otherwise angularly disposed thereto. The distal end portions 34 comprising the uppermost bifurcated ends of each yoke 32 are arranged to carry the installment head 36 thereon, as shown in FIGS. 1, 5 and 7. Each installment head 36 is adapted to carry a particular type of ceiling anchor 39, as may be seen in the aforementioned U.S. Patent. Each ceiling anchor 39 is adapted to clip onto the side edges of the ceiling rail 14 by a twisting motion thereagainst.

Figure 6:
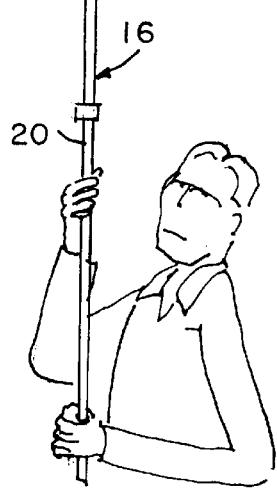
FIG. 6 is a side elevational representation of a first anchor being installed onto a ceiling rail.
Figure 6:
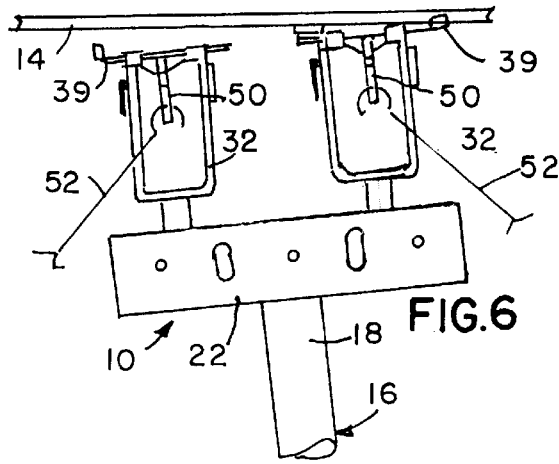

In operation of the ceiling anchor installation tool 10 of the present invention, a particular desired ceiling anchor 39 is arranged upon each installment head 36 on the distal end of each of the bifurcated yokes 34. A short hook member 50 is inserted into and secured to hang downwardly from each anchor 39 and is also disposed downwardly between the bifurcated arms 34 of each yoke 32, as shown in FIGS. 5 and 6.

An elongated rigid hook 52 is secured to each side of a channel 54 mounted onto and holding the upper edge of a sign 12 to be supported from the ceiling as shown in FIG. 5. The loose distal upper end of each elongated rigid hook 52 is secured to the lower end of each short hook member 50 already extending downwardly from each anchor 39. The lower end 20 of the telescopable pole 16 is held at a slight angle from the vertical, as shown in FIG. 6, tilting slightly to one side to allow a first anchor 39 thereon to be installed onto a ceiling rail 14 by twisting the anchor mechanism 39 thereagainst. The twisting action secures the first anchor 39 to the ceiling rail 14, and the tilted support pole is next lifted to another location or rail 14, to permit the second anchor 39 on the assembly 22 to be pressed against and locked into engagement on a further portion of the same or another ceiling rail 14 so as to permit the sign 12 to be hung with spaced-apart ceiling anchors 39 disposed on at least one rail 14 at a location further apart than the yokes 32 are on the installation tool 10, as may be seen in FIG. 7. The two anchors 39 may now be nudged one way or another longitudinally with respect to the axis of their respective ceiling rails 14, so as to permit the sign 12 to be hung in a stable and level manner, by a tool and procedure not shown in the art.

We claim:

1. A tool to permit the support and lifting of a planar sign member to a ceiling so as to attach that sign to a ceiling support rail, said tool comprising:

an elongated pole having a first or lower end and a second or upper end;

a frame assembly attached to said upper end of said pole; and a pair of spaced apart yokes mounted on said frame assembly on said upper end of said pole, each yoke being arranged to hold a ceiling anchor thereon, to permit each said ceiling anchor to be aligned against and attached to a ceiling rail on a ceiling, from which anchors a sign may be hung; and wherein said frame assembly is comprised of a pair of generally rectangularly shaped half-frame members, each of said half-frame members having a first channel disposed across one side thereof, to define an opening for receipt of said upper end of said elongated pole when said half-frame members are secured together.

2. The tool as recited in claim 1, wherein said half-frame members also have a pair of further channels arranged on the side common to said first channel, each spaced so as to provide a cylindrically shaped opening for receipt of said yoke therein.

3. The tool as recited in claim 2, wherein at least one of said yokes has a pair of bifurcated arms which defines a plane, and said channel and longitudinal axis of said half-frame member also defines a plane, said planes being parallel to one another.

4. The tool as recited in claim 2, wherein said channel has a bore extending transversely therethrough so as to receive a bolt for securing said half-frame members together.

5. A method of attaching a sign to a ceiling support rail in a ceiling, comprising the steps of:

attaching a pair of yokes to a frame assembly, which yokes each directionally align and carry an anchor for attachment to a ceiling support rail;

attaching said frame assembly to an elongated pole to permit said yokes and anchors to be lifted upwardly towards a ceiling;

attaching a hook arrangement to said anchors and to a sign to be lifted towards a ceiling;

lifting said pole tilted, so as to bring a first of said anchors in a first yoke towards a ceiling rail;

arranging said first anchor in parallel alignment with and attaching said first anchor to a ceiling rail;

moving said frame assembly to a further ceiling rail location;

lifting said pole tilted, so as to bring a second of said anchors in a second yoke towards a ceiling rail; and arranging said second anchor in parallel alignment with and attaching said second anchor to said further ceiling rail location and hence attaching a sign to a ceiling rail assembly in a ceiling.

6. The method as recited in claim 5, including the step of:

nudging at least one of said anchors attached to a rail, in a direction parallel to said rail, to permit moving and placement adjustment of said anchors and hence leveling and horizontal adjustment of a sign suspended thereby.

7. The method as recited in claim 5, including the step of:

placing a first anchor in one of said yokes and a second anchor in the other of said yokes to permit anchors to secure to different ceiling rails.

\* \* \* \* \*